United States Patent [19]
Dreitzler et al.

[11] 3,864,958
[45] Feb. 11, 1975

[54] DIRECT DISPLAY OF THERMAL CONDUCTIVITY PROFILE FOR NON-DESTRUCTIVE TESTING OF INSULATED ROCKET MOTOR CASES

[75] Inventors: David R. Dreitzler, Huntsville; Charles R. Moore, Hazel Green; Lawrence B. Thorn, Madison, all of Ala.

[73] Assignee: The United States of America as represented by the Secretary of the Army, Washington, D.C.

[22] Filed: Oct. 10, 1973

[21] Appl. No.: 405,231

[52] U.S. Cl. ............................. 73/15 R, 73/355 R
[51] Int. Cl. ........................................... G01n 25/72
[58] Field of Search ........................ 73/15, 351, 355

[56] References Cited
UNITED STATES PATENTS

| | | |
|---|---|---|
| 3,101,618 | 8/1963 | Hance .................................. 73/351 |
| 3,427,861 | 2/1969 | Maley .................................... 73/15 |
| 3,433,052 | 3/1969 | Maley .................................... 73/15 |
| 3,434,332 | 3/1969 | Maley .................................... 73/15 |
| 3,504,524 | 4/1970 | Maley .................................... 73/15 |
| 3,566,669 | 3/1971 | Lawrence et al. ..................... 73/15 |
| 3,596,519 | 8/1971 | Blonder ................................. 73/15 |
| 3,807,226 | 4/1974 | Williams ............................. 73/351 |

Primary Examiner—Herbert Goldstein
Attorney, Agent, or Firm—Edward J. Kelly; Herbert Berl; Robert C. Sims

[57] ABSTRACT

A cathode ray tube oscilloscope display of insulation flaws in thin-wall rocket motor cases is accomplished by scanning the case with an infrared detector. The detector signal is used to modulate the electron beam of the oscilloscope. A raster is provided which is synchronized with the mechanical scan of the motor case by means of waveform generators.

2 Claims, 5 Drawing Figures

3,864,958

DIRECT DISPLAY OF THERMAL CONDUCTIVITY PROFILE FOR NON-DESTRUCTIVE TESTING OF INSULATED ROCKET MOTOR CASES

SUMMARY OF THE INVENTION

The invention is directed towards an easily interpretable display of insulation flaws in thin-wall rocket motor cases. Of course the invention can be used to detect flaws of any material that can be detected by a scanning detector. The motor case under inspection is scanned using an infrared detector. Scanning can be implemented by a lathe chuck type arrangement. The resulting signal from the infrared detector is amplified and sent to an oscilloscope so as to intensity modulate same. Raster is provided for the oscilloscope by appropriate signals being sent to the X and Y axes of the oscilloscope. The resulting display will be related to the physical dimensions of the motor case if desired. The plot on the display will vary in intensity with the temperature being detected by the infrared detector. Therefore, the display will show faint lines in the raster or absence spots in the raster where the insulation is thicker than required and conversely will show very bright lines where the insulation is thinner than the desired predetermined dimension. A negative image would show the opposite and may be more useful in detecting thin spots in the insulation of the motor case.

The vertical sweep fed to the Y axis of the oscillator can be generated by providing a vertical sweep and sync circuit. This circuit consists of a constant current dc source connected across a capacitor and a reset switch. The source is also connected directly to the Y axis of the cathode ray tube oscillator. The reset switch is closed once each revolution of the motor case under inspection. This causes the voltage to the Y axis to drop to zero, and then when the switch opens again, the voltage will rise as the capacitor becomes charged up to a peak value. At this time the reset switch will be closed again in order to dump the capacitor's charge and bring the voltage down to zero again on the Y axis.

A waveform generator having a gentle slope is fed through amplifiers to the X axis of the cathode ray tube oscillator. The slope of the waveform is designed such that the desired coverage of the motor case will be displayed.

DESCRIPTION OF THE PREFERRED EMBODIMENT

Figure 1:
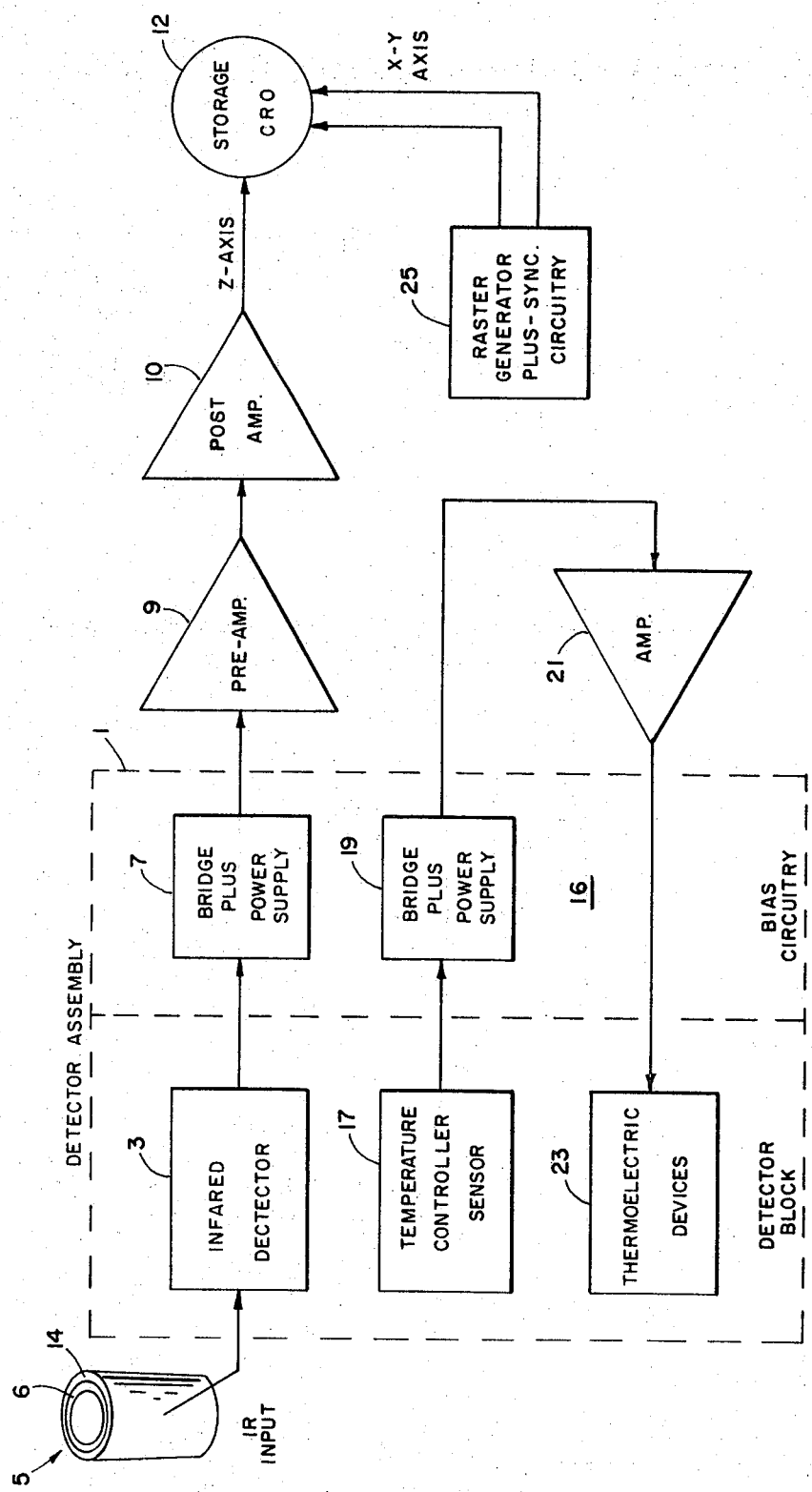
FIG. 1 shows an overall block diagram of the present invention.

The basic overall invention is shown in FIG. 1. A detector assembly 1 is divided up into two main blocks: the detector block and the bias circuitry. An infrared detector 3 is provided to sense the temperature of a motor casing 5 over a small area. The infrared being generated by the core 6 of the casing 5. Any of the well known infrared detectors can be used for infrared detector 3. Motor case 5 is rotated so that the small area that the infrared detector detects scans a predetermined area of the motor case 5 as it is turned in a device such as a lathe (not shown). The output of the infrared detector is fed to a bridge circuit 7 which provides the proper bias to the output of infrared detector. Any of the well known bridge circuits may be used.

Bridge circuit 7 has an output which is amplified by amplifiers 9 and 10 and sent to the Z axis of a storage cathode ray oscilloscope 12. In this way the intensity of the display on the oscilloscope is modulated by the heat output of the motor casing 5. The amount of heat output (or infrared output) detected by infrared detector 3 will depend upon the thickness of the insulation 14 around core 6. The thicker the insulation the less the output of detector 3, and therefore, the less intensification sent to oscilloscope 12. Conversely the thinner the thickness of the insulation 14 the higher the output from infrared detector will be, and the higher the intensification signal sent to the oscilloscope 12.

A temperature control loop 16 is provided to maintain the temperature of the detector at a constant level. Any of the well known temperature control loops could be used. The control loop shown in FIG. 1 consists of temperature control sensor 17 which detects the temperature of the infrared detector and sends this signal to a bridge network 19 which detects an error between the desired temperature and the actual temperature. Bridge network 19 has an output which is amplified by amplifier 21 and sent to thermoelectric devices 23 which controls the temperature of infrared detector 3. A similar control loop may be provided to evenly heat the inside of motor casing 5 or the casing can be heated by "static" firing.

A raster generator plus sync circuit 25 is shown in FIG. 1 as providing a raster to the X and Y axis of oscilloscope 12. This raster is generated such that it will correspond with the scanning by the infrared detector 3 of the motor case 5.

Figure 2:
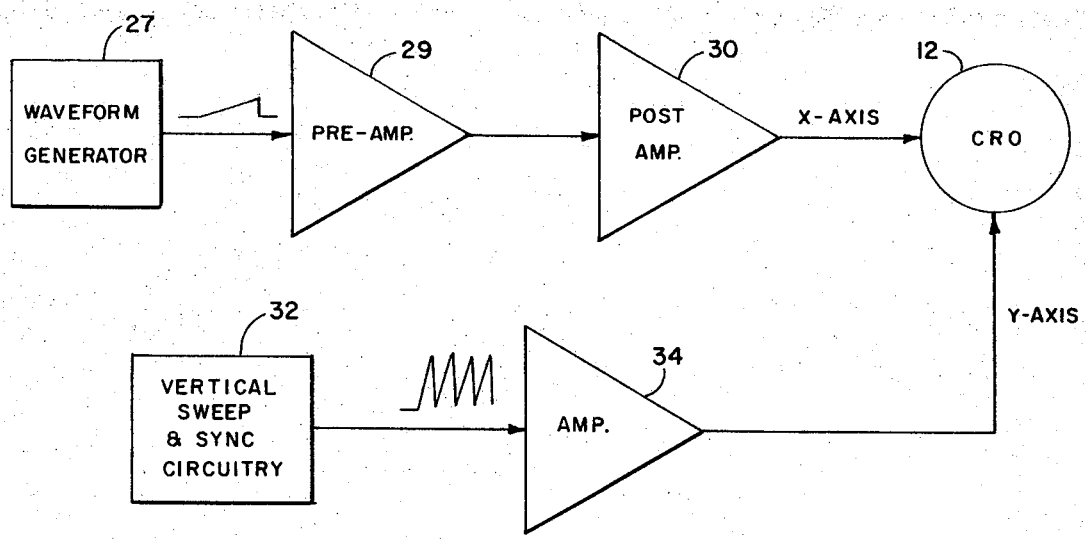
FIG. 2 shows a block diagram of the raster generator of the present invention.

FIG. 2 shows the generator and sync circuitry in greater detail. Waveform generator 27 provides a slope output (as shown) such that its duration will cause the oscilloscope 12 to scan in the X axis at a rate which will allow complete coverage of the motor case on the screen. The output of the waveform generator 27 is amplified by amplifiers 29 and 30 and fed to the X axis of oscilloscope 12. A vertical sweep and sync circuitry 32 is provided to produce a sawtooth waveform output which will cause the Y axis of oscilloscope 12 to sweep once each time a complete revolution of the motor case is made during scanning. The output of circuitry 32 is amplified by amplifier 34 and fed to the Y axis of oscilloscope 12.

Figure 3:
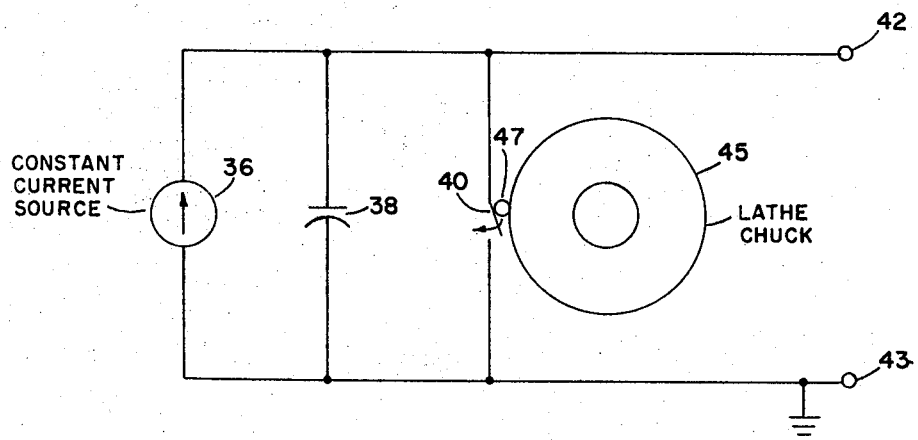
FIG. 3 shows the vertical sweep in sync circuit used in the present invention.

FIG. 3 shows the vertical sweep in sync circuitry in greater detail. A constant current dc source 36 is connected across the parallel combination of a capacitor 38, reset switch 40, and output terminals 42 and 43. Output terminals 42 and 43 feed the Y axis the oscilloscope. Lathe chuck 45 which rotates the motor casing is provided with a protrusion 47 which will close reset switch 40 briefly once each time the motor case is rotated 360°. When reset switch 40 is closed, the constant current source 36 will be short circuited therethrough and also the charge on capacitor 38 will be short circuited therethrough. This causes the output voltage on terminals 42 and 43 to drop to zero. When the reset switch 40 opens again capacitor 38 is now in a low charge position and will draw most of the current from constant current source 36. Therefore, output voltage of terminals 42 and 43 will slowly rise in voltage as the charge upon capacitor 38 builds up until the reset switch 40 is once again closed and the cycle is repeated. This produces the sawtooth wave output shown in FIG. 2.

Amplifier 34 of FIG. 2 is a variable gain amplifier and is adjusted such that a full scale vertical deflection is obtained on the oscilloscope 12. This vertical deflection will represent single circumferential scan of the motor case.

Figure 4:
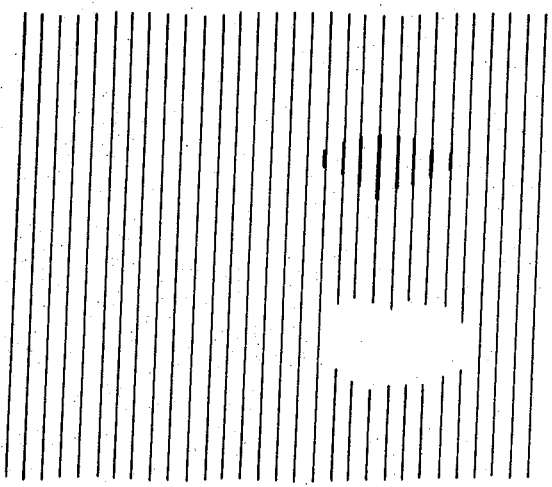
FIG. 4 is a positive image of a thermogram of a section of a motor case.
Figure 5:
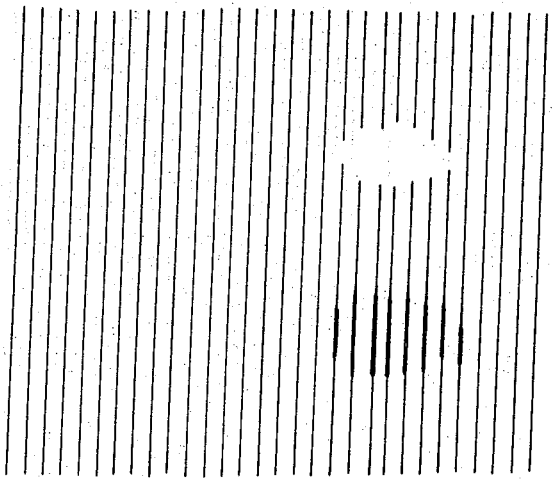
FIG. 5 is a negative image of a thermogram of the same section of the same motor case as presented in FIG. 4.

FIGS. 4 and 5 show a typical display that will be obtained on an oscilloscope readout of a defective motor case. FIG. 4 is a positive image, and FIG. 5 is a negative image of the same area of a motor case. For drafting convenience the raster of the oscilloscope which is intensity modified by the infrared detector is shown in black in FIGS. 4 and 5. If each figure were folded together to form a cylinder, that cylinder would represent the motor case area being detected. As can be seen on the right hand top side of FIG. 4, a intensity output of the oscilloscope is greater indicating that the insulation of the motor case in that area is defective in that it is thinner than the rest of the insulation. In the lower right a defective insulation due to too thick of an insulation is indicated. FIG. 5 shows a negative image of the same area and may be obtained by switching the oscilloscope 12 or by using a different connection on the bridge circuit connected to the infrared detector. In the negative image shown in FIG. 5, the thin insulation shows up as a blank space whereas the thick insulation shows up as a higher intensity showing on the oscilloscope. A normal motor case would have an oscilloscope raster which is even in intensity. This provides an easily interpretable display of insulation flaws in thin-wall rocket motor cases.

We claim:

1. An easily interpretable display of insulation flaws system comprising an insulated object to be examined; radiation sensing means positioned such that a small area of the insulated object will be sensed at one point in time; moving means connected to said insulated object and said radiation sensing means for moving them relative to each other such that said radiation sensing means will scan a predetermined area of said insulated object; display means connected to an output of said radiation sensing means such that the area scanned will be displayed; said display means is an oscilloscope having X and Y scan and input terminals said radiation sensing means having an output connected to the Z input terminal of said oscilloscope such that it will intensity modulate the display of said oscilloscope; raster circuit means being connected to said X and Y input axes such that the area of display will correspond to the area scanned on said insulated object; said radiation sensing means is an infrared detector and said insulated object is a thin-wall insulated rocket motor case; said raster circuit means comprises a waveform generator having a long gentle slope output and a vertical sweep circuitry having a sawtooth output; amplifiers connected between the raster circuits and the X and Y input terminals of the oscilloscope; said vertical sweep circuitry comprises a constant current source connected directly to said Y axis; a capacitor connected in parallel with said constant current source; a reset switch being connected in parallel with said constant source and said capacitor; and synchronizing means connected to said reset switch and said moving means such that it will be periodically closed for a short period of time in synchronism with the scan of the insulated object.

2. A display system as set forth in claim 1 wherein said moving means is a lathe means connected to said motor case to cause the relative movement; and said synchronizing means being connected to the lathe means such that it will temporarily close said reset switch once each revolution of said motor case.

* * * * *